UNITED STATES PATENT OFFICE 2,315,939

TRIAZINE DERIVATIVES

Gaetano F. D'Alelio, Pittsfield, Mass., assignor to General Electric Company, a corporation of New York No Drawing. Application January 28, 1942,
Serial No. 428,552

18 Claims. (Cl. 260—248)

This invention relates to new chemical compounds and more particularly to triazine derivatives. The invention especially is concerned with the production of new and useful triazinyl carbocyclic-carbamyl-alkyl sulfides and triazinyl carbocyclic-thiocarbamyl-alkyl sulfides.

The new chemical compounds of this invention may be represented graphically by the following general formula:

I 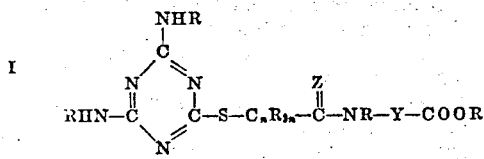

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halo-hydrocarbon radicals. Since $n$ represents an integer which is 1 or 2, it will be seen that the linkage of the carbocyclic-carbamyl-alkyl or carbocyclic-thiocarbamyl-alkyl grouping to the sulfur atom in all cases will be alpha or beta to the carbocyclic-carbamyl or -thiocarbamyl grouping. It also will be observed that linkage of the triazinyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen, specifically chlorine, bromine, fluorine or iodine. Specific examples of halogeno-substituted hydrocarbon radicals are chloromethyl, chloroethyl, chlorophenyl, dichlorophenyl, iodophenyl, fluorotolyl, chlorocyclohexyl, ethyl chlorophenyl, phenyl chloroethyl, bromoethyl, bromopropyl, bromotolyl, etc. Preferably R in Formula I is hydrogen. However, there also may be produced in accordance with the present invention compounds such, for instance, as those represented by the general formulas II 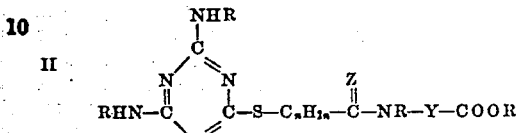

and, more particularly,

III 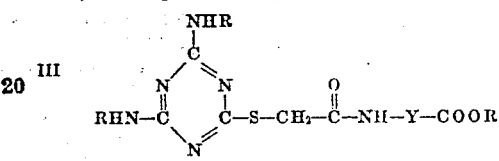

where $n$, Z, Y and R have the same meanings as above given with respect to Formula I.

Illustrative examples of divalent carbocyclic radicals that Y in Formulas I, II and III may represent are: divalent aryl, e. g., phenylene, xenylene, naphthylene, etc.; divalent aliphatic-aryl, e. g., 2,5-toluylene, 1,4-dimethyl 2,3-phenylene, etc.; divalent cycloaliphatic, e. g., cyclopentylene, cyclohexylene, cyclohexenylene, cycloheptylene, etc.; and their homologues, as well as those divalent carbocyclic radicals with one or more of their hydrogen atoms replaced by a substituent, e. g., halogeno, amino, acetyl, hydroxy, acetoxy, alkoxy, aryloxy, sulfamyl, alkyl, alkenyl, a —COOR group or groups in addition to the single —COOR group shown in the above formulas, etc. Specific examples of substituted divalent carbocyclic radicals are chlorophenylene, bromophenylene, chloronaphthylene, bromonaphthylene, bromo 2,5-toluylene, chlorocyclopentylene, chlorocyclopentenylene, hydroxyphenylene, ethoxyphenylene, acetophenylene, acetoxyphenylene, bromocyclopentenylene, methylphenylene (toluylene), allylphenylene, etc. Preferably Y is phenylene or methylphenylene.

The new compounds of this invention may be used, for example, as pharmaceuticals, plasticizers and as intermediates in the preparation of derivatives thereof such as hydrazo, hydrazino, carbazido, semicarbazido, ureido, amidine, methylol, etc., derivatives of the individual compound embraced by Formula I. These new organic sulfides are especially valuable in the preparation of synthetic resinous compositions. Thus, they may be condensed with, for instance, aldehydes, including polymeric aldehydes, hydroxy aldehydes and aldehyde-addition products, to yield condensation products of particular utility in the plastics and coating arts. Such condensation products are more fully described and are specifically claimed in my copending application Serial No. 428,585, filed concurrently herewith now Patent No. 2,312,704, issued March 2, 1943, and assigned to the same assignee as the present invention. Those compounds wherein R in the —COOR grouping represents a hydrogen atom advantageously may be used as such, or in the form of their alkylol (e. g., methylol) derivatives, as agents for accelerating the conversion of thermosetting or potentially thermosetting aminoplasts (e. g., urea-formaldehyde resins) to an insoluble, infusible state. These new organic sulfides also may be compounded with rubber, both natural and synthetic, to modify the properties of the rubber.

Various methods may be employed to produce the chemical compounds of this invention. I prefer to prepare them by a process which comprises effecting reaction between a diamino [(-NHR)₂] mercapto symmetrical triazine (s-triazine) and a carboxy-, carboaliphthaticoxy- (including carbocycloaliphaticoxy-) or carboaromaticoxy-carbocyclic-carbamyl or -thiocarbamyl-alkyl halide in the presence of a hydrosalide acceptor, e. g., an alkali-metal hydroxide. When a carboxy (-COOH)-carbocyclic-carbamyl or -thiocarbamyl-alkyl halide is used as a starting reactant and the proportions of reactants and reaction conditions are such that the hydrogen atom of the -COOH group of the carboxycarbocyclic compound is replaced by the residue of the hydrohalide acceptor, e. g., by an alkali metal, the carboxy compound desired as a final product is obtained by treating this intermediate product with hydrochloric, hydrobromic, sulfuric or other suitable inorganic or organic acid in an amount just sufficient to form the desired carboxy derivative.

Illustrative examples of mercapto diamino s-triazines that may be used, depending upon the particular end-product desired, are:

2-mercapto 4,6-diamino s-triazine (4-mercapto 2,6-diamino s-triazine; 6-mercapto 2,4-diamino s-triazine)
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-hexylamino 6-naphthylamino s-triazine
2-mercapto 4,6-di-(iodanilino) s-triazine
2-mercapto 4,6-di-(bromoanilino) s-triazine
2-mercapto 4-chlorocyclopentylamino 6-toluido s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cycloheptylamino 6-isopropylphenylamino s-triazine
2-mercapto 4-isopropylanilino 6-phenylpropylamino s-triazine
2-mercapto 4-amino 6-bromoethylamino s-triazine
2-mercapto 4-amino 6-methylamino s-triazine
2-mercapto 4-aminoanilino 6-ethylphenylamino s-triazine
2-mercapto 4-amino 6-benzylamino s-triazine Illustrative examples of carboxy-, carboaliphaticoxy- and carboaromaticoxy-carbocyclic-carbamyl and -thiocarbamyl-alkyl halides that may be employed, depending upon the particular end-product sought, are:

The ortho-, meta- and para-carboxyphenyl-carbamyl chloro methanes
The ortho-, meta- and para-carboxytolyl-carbamyl bromo methanes
The ortho-, meta- and para-carboxyphenyl-thiocarbamyl chloro methanes
The ortho-, meta- and para-carboalkoxy (e. g., carbomethoxy, carboethoxy, carbopropoxy, carbobutoxy, etc.) phenyl-carbamyl chloro methanes
The ortho-, meta- and para-carboaroxy (e. g., carbophenoxy, carbonaphthoxy, etc.) tolyl-carbamyl chloro methanes
Alpha - (para - carboxyphenyl - carbamyl) beta-chloro ethane
Alpha-(meta-carboxyphenyl-thiocarbamyl) alpha-chloro ethane
Alpha - (ortho-carbomethoxytolyl-thiocarbamyl) beta-chloro ethane
Alpha-(para-carboethoxyphenyl-carbamyl) alpha-chloro ethane
Alpha-(ortho-carboxyphenyl - carbamyl) alpha-chloro pentane
Alpha - (para - carbobutoxytolyl - thiocarbamyl) beta-chloro hexane
Ortho - carbopropoxyphenyl-(methyl)-carbamyl bromo methane
Para - carbophenoxyphenyl - (ethyl) - carbamyl chloro methane
Alpha - (4-carbopentoxynaphthyl-[1]-carbamyl) beta-chlor butane
Alpha-(para-carbophenoxy chloro phenyl-carbamyl) alpha-ethyl beta-phenyl beta-bromo ethane
Carboxytolyl-carbamyl cyclopentyl chloro methane
Carboethoxytolyl-(butyl)-carbamyl bromo methane
Para - carbomethoxyphenyl -(cyclopentyl) - thiocarbamyl chloro methane
Ortho - carbophenoxyphenyl -(chloroethyl) - carbamyl chloro methane
4-carboxycyclohexyl-(phenyl)-carbamyl chloro methane
Alpha-[para-carboethoxy chloro phenyl-(bromophenyl)-thiocarbamyl] alpha-chlorocyclohexenyl beta-chloro ethane
3-carbobutoxycyclopentyl-carbamyl tolyl chloro methane
Alpha-[4-carboxy 2-chloro cyclopentyl-(xenyl)-carbamyl] alpha-chloroxylyl beta-chloro ethane
Alpha-(para-carboethoxyphenyl-carbamyl) alpha-iodo omega-chloro pentane Carboxycyclohexenyl -(phenylisopropyl)- carbamyl chlorocyclopentenyl chloro methane The ortho-, meta- and para-carboalkoxyphenyl-carbamyl iodo methanes Alpha - [para-carbopropoxyxenyl-(isobutylphenyl)-carbamyl] beta-naphthyl beta-bromo ethane Alpha-[para-carboxy chloro phenyl-(isopentyl) thiocarbamyl] alpha-ethyl alpha-tolyl beta-phenyl beta-bromo propane Various hydrohalide acceptors may be employed. I prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the chosen carboxy-, carboaliphaticoxy- or carboaromaticoxy-carbocyclic-carbamyl or -thiocarbamyl-alkyl halide may be carried out in any suitable manner, but preferably is effected in the presence of a suitable solvent or mixture of solvents. Although various solvents and solvent mixtures may be employed, for economic reasons and because of their eminent suitability I prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

From the foregoing description it will be seen that the present invention provides a method of preparing chemical compounds corresponding to the general formula

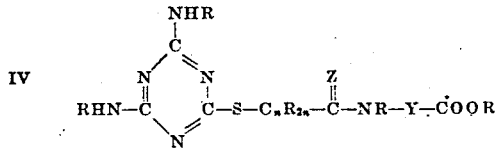

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals, said method comprising effecting reaction, in the presence of a hydrohalide acceptor, between (1) a mercapto triazine corresponding to the general formula

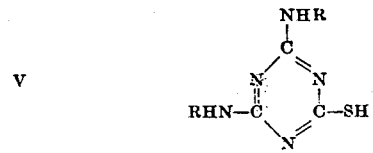

where R has the meaning above given, and (2) a halide corresponding to the general formula

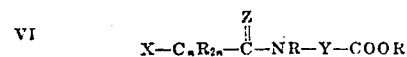

where X represents halogen, and $n$, Z, Y and R have the meanings above given.

The new chemical compounds of this invention also may be prepared by a process which comprises effecting reaction between a halogenated diamino s-triazine and a carboxy-, carboaliphaticoxy- or carboaromaticoxy-carbocyclic-carbamyl or -thiocarbamyl mercapto alkane in the presence of a hydrohalide acceptor. This reaction preferably is carried out in the presence of an anhydrous solvent. An anhydrous solvent, e. g., alcohol, is desirable because one of the reactants, namely, the halogenated diamino s-triazine, is hydrolyzable. The other conditions for preparing the compounds of the invention may be the same as described above with reference to the first-mentioned method of preparation.

In order that those skilled in the art better may understand how the present invention may be carried into effect, the following illustrative examples are given. All parts are by weight.

*Example 1*

This example illustrates the preparation of diamino s-triazinyl para-carboethoxyphenyl-carbamyl-methyl sulfide, the formula for which is

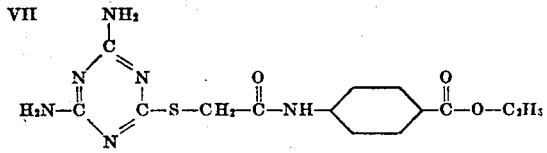

| | Parts | Mol ratios |
|---|---|---|
| Para-carboethoxyphenyl-carbamyl chloro methane | 161 | 0.67 |
| Thioammeline | 106 | 0.74 |
| Sodium hydroxide | 30 | 0.75 |

A small molecular excess of sodium hydroxide and thioammeline over the amount of para-carboethoxyphenyl - carbamyl chloro methane was used in order to insure complete utilization of the latter. The thioammeline was added to a solution of the stated amount of sodium hydroxide in 2,000 parts water and the resulting mixture was heated. This resulted in the formation of the sodium salt of thioammeline. After cooling to room temperature the para-carboethoxyphenyl-carbamyl chloro methane was added to the solution of the sodium thioammeline. The mixture was stirred rapidly. Reaction began almost immediately with the formation at first of a compound having a dull, conglomerate type of crystalline structure as contrasted with the starting halide reactant, which was a glistening, sharply defined crystalline material. The mixture was stirred at room temperature for 20 minutes and then heated. After heating for 1 minute a sudden reaction took place in which the entire mass was converted into a thick, milky precipitate. The mixture was allowed to cool with stirring for 25 minutes and then was allowed to stand without stirring for about 16 hours. The precipitated solid comprising para-carboethoxyphenyl-carbamyl-methyl sulfide was filtered off, washed free of water-soluble salts and dried. The purified sulfide had a melting point of 112°–113° C. and began to decompose with discoloration at a temperature of 195° C. (Thioammeline neither melts or decomposes below 275° C.) Unlike thioammeline the diamino s-triazinyl para - carboethoxyphenyl - carbamyl-methyl sulfide does not dissolve in an aqueous sodium hydroxide solution. The sulfide also has none of the vesicating characteristics of para-carboethoxyphenyl-carbamyl chloro methane.

The above reaction may be illustrated by the following chemical equations:

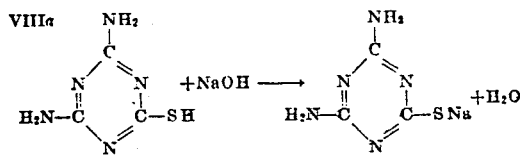

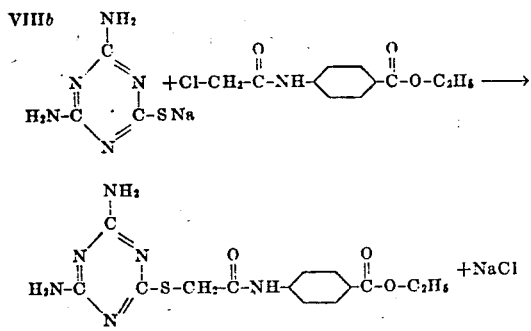

Diamino s-triazinyl ortho- and meta-carboethoxyphenyl-carbamyl-methyl sulfides are prepared in essentially the same manner as described above with particular reference to the preparation of diamino s-triazinyl para-carboethoxyphenyl-carbamyl-methyl sulfides with the exception that 161 parts of ortho- or meta-carboethoxyphenyl-carbamyl chloro methane is used instead of 161 parts of para-carboethoxyphenyl-carbamyl chloro methane.

*Example 2*

Di-(methylamino) s-triazinyl para-carboethoxyphenyl-carbamyl-methyl sulfide is prepared in essentially the same manner as described under Example 1 with the exception that, instead of 106 parts thioammeline, an equivalent amount of mercapto di-(methylamino) s-triazine is employed.

*Example 3*

Diamino s-triazinyl carboxy (ortho-, meta- or para-carboxy) phenyl-carbamyl-methyl sulfide is prepared in essentially the same manner as set forth under Example 1 with the exception that, instead of 161 parts para-carboethoxyphenyl-carbamyl chloro methane, an equivalent amount of carboxy (ortho-, meta- or para-carboxy) phenyl-carbamyl chloro methane is used. To insure a maximum yield of the carboxy derivative, an acid (e. g., hydrochloric acid) may be added to the reaction mass at the end of the reaction period, the acid being added in an amount just sufficient to make the mass neutral to litmus. The precipitated solid then is filtered off, washed and dried as in Example 1.

*Example 4*

Diamino s-triazinyl carbophenoxy (ortho-, meta- or para-carbophenoxy) phenyl-carbamyl-methyl sulfide is prepared in essentially the same manner as described under Example 1 with the exception that, instead of 161 parts para-carboethoxyphenyl-carbamyl chloro methane, an equivalent amount of carbophenoxy (ortho-, meta- or para-carbophenoxy) phenyl-carbamyl chloro methane is employed.

*Example 5*

Diamino s-triazinyl carboalkoxy (e. g., ortho-, meta- or para-carbomethoxy, -carboethoxy, etc.) tolyl-carbamyl-methyl sulfide is prepared in essentially the same manner as described under Example 1 with the exception that, in place of 161 parts of para-carboethoxyphenyl-carbamyl chloro methane, an equivalent amount of carboalkoxy (e. g., ortho-, meta- or para-carbomethoxy, -carboethoxy, etc.) tolyl-carbamyl chloro methane is employed.

*Example 6*

Diamino s-triazinyl alpha- or beta-(para-carboethoxyphenyl-carbamyl-ethyl) sulfide is prepared in essentially the same manner as described under Example 1 with the exception that, instead of 161 parts para-carboethoxyphenyl-carbamyl chloro methane, an equivalent amount of alpha-(para-carboethoxyphenyl-carbamyl) alpha- or beta-chloro ethane is used.

Illustrative examples of other compounds of this invention, and which may be prepared as hereinbefore described, are:

The diamino s-triazinyl ortho-, meta- and para-, carboxy-, carboalkoxy- and carboaryloxy-phenyl-carbamyl-methyl sulfides The diamino s-triazinyl ortho-, meta- and para-, carboxy-, carboalkoxy- and carboaryloxy-phenyl-thiocarbamyl-methyl sulfides The diamino s-triazinyl ortho-, meta- and para-, carboxy-, carboalkoxy- and carboaryloxy-tolyl-carbamyl-methyl sulfides The diamino s-triazinyl ortho-, meta- and para-, carboxy-, carboalkoxy- and carboaryloxy-tolyl-thiocarbamyl-methyl sulfides The di-(methylamino) s-triazinyl ortho-, meta- and para-, carboxy-, carboalkoxy- and carboaryloxy-phenyl-carbamyl-methyl sulfides The di-(ethylamino) s-triazinyl ortho-, meta- and para-, carboxy-, carboalkoxy- and carboaryloxy-phenyl-thiocarbamyl-methyl sulfides The di-(anilino) s-triazinyl ortho-, meta- and para-, carboxy-, carboalkoxy- and carboaryloxy-tolyl-carbamyl-methyl sulfides The di-(cyclohexylamino) s-triazinyl ortho-, meta- and para-, carboxy-, carboalkoxy- and carboaryloxy-tolyl-thiocarbamyl-methyl sulfides The diamino s-triazinyl alpha-(ortho-, meta- and para-, carboxy-, carboalkoxy- and carboaryloxy-phenyl-carbamyl-ethyl) sulfides The diamino s-triazinyl beta-(ortho-, meta- and para-, carboxy-, carboalkoxy- and carboaryloxy-phenyl-carbamyl-ethyl) sulfides The diamino s-triazinyl alpha-(ortho-, meta- and para-, carboxy-, carboalkoxy- and carboaryloxy-phenyl-thiocarbamyl-ethyl) sulfides The diamino s-triazinyl beta-(ortho-, meta- and para-, carboxy-, carboalkoxy- and carboaryloxy-phenyl-thiocarbamyl-ethyl) sulfides The diamino s-triazinyl ortho-, meta- and para-, carbohaloalkoxy- and carbohaloaryloxy-phenyl-carbamyl-methyl sulfides The diamino s-triazinyl ortho-, meta- and para-, carbocycloaliphaticoxy- and carbohalocycloaliphaticoxy-phenyl-carbamyl-methyl sulfides The diamino s-triazinyl ortho-, meta- and para-, carboalkenyloxy- and carbohaloalkenyloxy-tolyl-carbamyl-methyl sulfides The diamino s-triazinyl ortho-, meta- and para-, carbocycloalkenyloxy- and carbohalocycloalkenyloxy-tolyl-carbamyl-methyl sulfides The diamino s-triazinyl alpha-(ortho-, meta- and para-, carboxy-, carboalkoxy- and carboaryloxy-tolyl-carbamyl-ethyl) sulfides The diamino s-triazinyl beta-(ortho-, meta- and para-, carboxy-, carboalkoxy- and carboaryloxy-tolyl-carbamyl-ethyl) sulfides The diamino s-triazinyl alpha-(ortho-, meta- and para-, carboxy-, carboalkoxy- and carboaryloxy-tolyl-thiocarbamyl-ethyl) sulfides The diamino s-triazinyl beta-(ortho-, meta- and para-, carboxy-, carboalkoxy- and carboaryloxy-tolyl-thiocarbamyl-ethyl) sulfides The di-(methylamino) s-triazinyl alpha-(ortho-, meta- and para-, carboxy-, carboalkoxy- and carboaryloxy-phenyl-carbamyl-ethyl) sulfides The di-(propylamino) s-triazinyl beta-(ortho-, meta- and para-, carboxy-, carboalkoxy- and carboaryloxy-phenyl-carbamyl-ethyl) sulfides The di-(anilino) s-triazinyl alpha-(ortho-, meta- and para-, carboxy-, carboalkoxy- and carboaryloxy-tolyl-carbamyl-ethyl) sulfides The di-(cycloheptylamino) s-triazinyl beta-(ortho-, meta- and para-, carboxy-, carboalkoxy- and carboaryloxy-tolyl-carbamyl-ethyl) sulfides The di-(ethylamino) s-triazinyl alpha-(ortho-, meta- and para-, carboxy-, carboalkoxy- and carboaryloxy-phenyl-thiocarbamyl-ethyl) sulfides 4-ethylamino 6-amino s-triazinyl-2 alpha-(para-carboethoxyphenyl-carbamyl-pentyl) sulfide 4-(3'-butenylamino) 6-methylamino s-triazinyl-2 carbomethoxyphenyl-carbamyl-(phenyl)-methyl sulfide 4-cyclohexenylamino 6-naphthylamino s-triazinyl-2 para-carbobutoxyphenyl-(chloroethyl)-carbamyl-methyl sulfide 4-chlorocyclopentylamino 6-toluido s-triazinyl-2 carbochlorophenoxycyclohexyl-(phenyl)-carbamyl-methyl sulfide 4-bromotoluido 6-benzylamino s-triazinyl-2 carbopropoxycyclopentyl-carbamyl-(tolyl)-methyl sulfide 4,6-di-(iodophenylamino) s-triazinyl-2 carboethoxychlorophenyl-carbamyl-methyl sulfide 4-amino 6-fluorotoluido s-triazinyl-2 carbopentoxytolyl-carbamyl-methyl sulfide Diamino s-triazinyl carbobromophenoxyphenyl-carbamyl-methyl sulfide Diamino s-triazinyl carbochloroethoxychlorophenyl-carbamyl-methyl sulfide Diamino s-triazinyl carbomethoxyiodophenyl-carbamyl-methyl sulfide Diamino s-triazinyl carboethoxycyclohexenyl-carbamyl-methyl sulfide Diamino s-triazinyl carbophenoxychlorocycloheptyl-carbamyl-methyl sulfide Diamino s-triazinyl para-carbophenoxyphenyl-carbamyl-(ethyl)-methyl sulfide Diamino s-triazinyl alpha-(ortho-carbobutoxytolyl-carbamyl-ethyl) sulfide Diamino s-triazinyl beta-(meta-carbopropoxyphenyl-thiocarbamyl-ethyl) sulfide Diamino s-triazinyl alpha-(carboethoxycyclohexyl-carbamyl-ethyl) sulfide Diamino s-triazinyl beta-(carbophenoxycyclohexenyl-carbamyl-ethyl) sulfide Diamino s-triazinyl alpha-(carbomethoxychlorocyclohexyl-thiocarbamyl-ethyl) sulfide In a manner similar to that described above with particular reference to the diamino [(-NHR)₂] s-triazinyl carbocyclic-carbamyl-alkyl sulfides, corresponding derivatives of the asymmetrical and vicinal triazines may be prepared. It also will be understood from the foregoing description of a triazine monosulfide

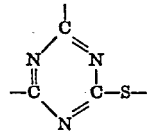

that similar compounds may be prepared in which two or three sulfur atoms are attached directly to a carbon atom of the triazine nucleus, thus:

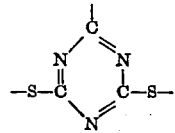

and

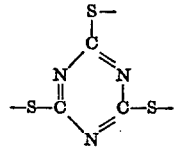

It also will be apparent to those skilled in the art that both the triazinyl mono- and poly-substituted (e. g., di-carboxy, di-carboalkoxy, di-carboaryloxy, tri-carboxy, tri-carboalkoxy, tri-carboaryloxy, etc.) carbocyclic-carbamyl- and thiocarbamyl-methyl and -ethyl sulfides may be produced as herein described.

What I claim as new and desire to secure by Letters Patent of the United States is:

1. Chemical compounds corresponding to the general formula

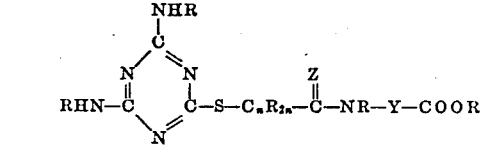

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

2. Chemical compounds as in claim 1 wherein R represents hydrogen.

3. Chemical compounds as in claim 1 wherein R represents hydrogen, Z represents a member of the class consisting of oxygen and sulfur, and $n$ is 1.

4. Chemical compounds corresponding to the general formula

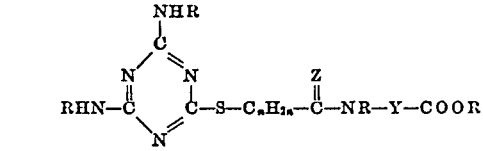

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

5. Chemical compounds corresponding to the general formula

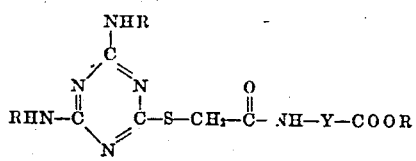

where Y represents a divalent carbocyclic radical, and R represents a member of the class consisting of hydrogen and monovalent hydrocarbon and halo-hydrocarbon radicals.

6. A diamino s-triazinyl carboalkoxycarbocyclic-carbamyl-methyl sulfide.

7. A diamino s-triazinyl carboalkoxyaryl-carbamyl-methyl sulfide.

8. A diamino s-triazinyl carboalkoxyphenyl-carbamyl-methyl sulfide.

9. A diamino s-triazinyl carboethoxyphenyl-carbamyl-methyl sulfide.

10. Diamino s-triazinyl para-carboethoxyphenyl-carbamyl-methyl sulfide.

11. A diamino s-triazinyl carboalkoxytolyl-carbamyl-methyl sulfide.

12. A diamino s-triazinyl carboaryloxycarbocyclic-carbamyl-methyl sulfide.

13. A diamino s-triazinyl carbophenoxyphenyl-carbamyl-methyl sulfide.

14. The method of preparing chemical compounds corresponding to the general formula

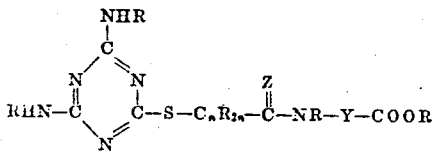

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals, said method comprising effecting reaction, in the presence of a hydrohalide acceptor, between (1) a mercapto triazine corresponding to the general formula

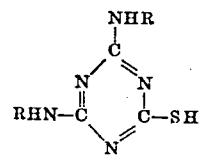

where R has the meaning above given, and (2) a halide corresponding to the general formula

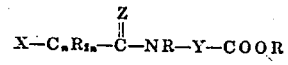

where X represents halogen, and $n$, Z, Y and R have the meanings above given.

15. A method as in claim 14 wherein the hydrohalide acceptor is an alkali-metal hydroxide.

16. The method of preparing a diamino s-triazinyl carboalkoxyphenyl-carbamyl-methyl sulfide which comprises effecting reaction, in the presence of a hydrohalide acceptor, between thioammeline and a carboalkoxyphenyl-carbamyl chloro methane.

17. The method of preparing a diamino s-triazinyl carboethoxyphenyl-carbamyl-methyl sulfide which comprises effecting reaction, in the presence of an alkali-metal hydroxide, between thioammeline and a carboethoxyphenyl-carbamyl chloro methane.

18. The method of preparing diamino s-triazinyl para-carboethoxyphenyl-carbamyl-methyl sulfide which comprises effecting reaction, in the presence of sodium hydroxide, between thioammeline and para-carboethoxyphenyl-carbamyl chloro methane.

GAETANO F. D'ALELIO.

CERTIFICATE OF CORRECTION.

Patent No. 2,315,939.  April 6, 1943.

GAETANO F. D'ALELIO.

It is hereby certified that error appears in the printed specification of the above numbered patent requiring correction as follows: Page 1, first column, line 39, for "diphenl" read --diphenyl--; page 2, first column, line 16, before "now" insert a comma; line 34, for "carboaliphthaticoxy" read --carboalithaticoxy--; line 37, for "hydrosalide" read --hydrohalide--; line 70, for "(iodanilino)" read --(iodoanilino)--; and second column, line 9, before "2-mercapto 4-amino" insert --2-mercapto 4-dichloroanilino 6-chloroethylamino s-triazine--; line 52, for "beta-chlor" read --beta-chloro--; page 3, second column, line 73, for "or" read --nor--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.